Jan. 10, 1939. H. G. LOMBARD 2,143,605
FASTENING MEANS
Original Filed Dec. 8, 1936
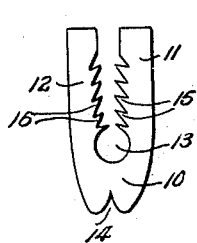
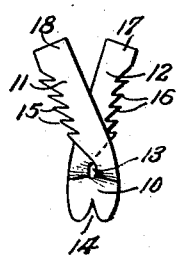
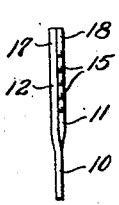
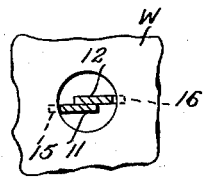
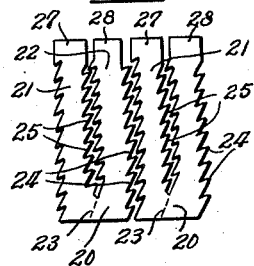
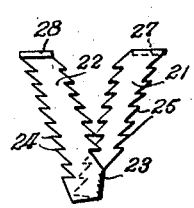
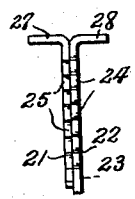
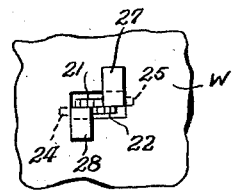
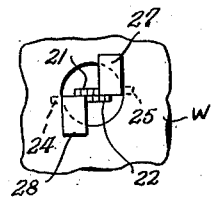
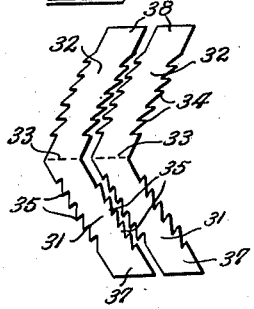
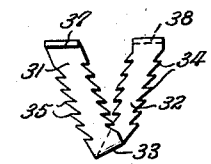
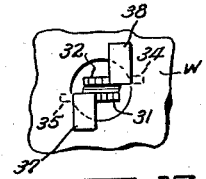
INVENTOR.
H. G. Lombard Patented Jan. 10, 1939

2,143,605

UNITED STATES PATENT OFFICE 2,143,605

FASTENING MEANS

Herman G. Lombard, Washington, D. C., assignor to Albert H. Tinnerman, Cleveland, Ohio Original application December 8, 1936, Serial No. 114,825, now Patent No. 2,077,120, dated April 13, 1937. Divided and this application March 26, 1937, Serial No. 133,251

5 Claims. (Cl. 85—5)

This invention relates to fastening means of general application and of the type constructed from relatively thin material of sheet or strip form such as sheet spring steel, sheet metal, cold rolled metal, and the like.

This application is a division of a prior copending application entitled "Fastening means", Serial No. 114,825, filed December 8, 1936, since issued as Patent Number 2,077,120, April 13, 1937.

More particularly, the fastening means of this application comprise various forms of devices in which the shank structures consist of relatively yieldable leg elements the longitudinal edges of which are out of line in normal relation, such as to effect an engagement thereof under tension in fastening position against the side-walls or edges of an aperture in work.

Fastening devices of the type with which this invention deals are usually constructed of metal sheet material of suitable thickness, such as strip stock, or blank stampings from relatively wide stock. In the forming operation, the devices are so constructed as to provide various types of shank structures comprising relatively yieldable leg elements or shank sections, the head structures being provided from the free ends of the legs and suitably deformed for cooperation with an object to be secured or part to be supported.

In any form of fastening device in which there is obtained a yieldable relation of the shank sections or leg elements, an effective fastening means is provided in that on applying such a device to work in an aperture of less width or diameter than the spacing of overall width of the shank sections, a tension is set up in the shank sections, which tension provides a friction, press fit of the device in fastening position intended to prevent loosening and removal of the device from such position.

Heretofore, such fastening devices have been used somewhat satisfactorily in applications where no great degree of movement or vibration takes place in the work or members fastened or supported. However, where any degree of strain, jarring or vibration takes place, the shanks of such types of fasteners tend to loosen from their fastening position and eventually become completely removed due to the fact that the sections or elements comprising the shank do not possess sufficient inherent holding power and ability under such conditions.

It is therefore an object of this invention to provide various forms of fastening means and securing devices in which the shanks are composed of relatively yieldable elements or leg sections so disposed with respect to each other as to permit quick, easy insertion of the devices into a work aperture by a flexing and relative yielding thereof, yet when in fastening position, have such a degree of stiffness, rigidity and tension stored therein through contact and compression against the side walls of the aperture that a tension is set up in the shank sections whereby substantial resistance is offered to withdrawal of the devices and extraordinary resistance is provided against loosening or tendency of the devices moving from applied position due to vibration, jarring or strain set up in the members fastened or in a member to which the device is applied.

It is a further object of this invention to provide various forms and constructions of fastening means and securing devices in which the shank members are composed of relatively yieldable shank sections which are so disposed in normal, untensioned relation as to engage the side-walls of the work aperture under compression in applied fastening position, whereby a tension is set up in the shank sections effecting a friction or press fit of the securing devices in such fastening position.

A further object of the invention is to provide securing devices the shank elements of which are so disposed in normal, untensioned relation as to be placed under compression in contact against the aperture side walls to seat under tension in fastening position, the said shank sections being provided with integral, projecting or lug means such as shoulders, teeth, or cam surfaces serving to securely engage the work in fastening position, and thereby rigidly retain the devices in such position under tension due to the relative contraction, compression, and movement of said shank sections from their normal, untensioned relation on being applied to a work aperture and advanced to fastening position, whereby an effective seating and locking of the devices in fastening position is obtained due to the action of the shank sections in attempting to assume their initial, normal untensioned relation.

Another object of the invention is to provide fastening devices constructed from blank stampings and deformed to provide shank structures comprising leg elements integrally united in the leading ends of the devices and which leg elements are laterally offset in normal, untensioned relation.

Further objects and advantages of the invention will be apparent to those skilled in the art as a description thereof proceeds with reference to the accompanying drawing in which like reference characters designate like parts throughout the same, and in which:

Fig. 1 represents a blank for a device in which the shank legs may be laterally offset by a stretching and deformation of the blank material in the area in which the legs are integral;

Fig. 2 is a side elevation of a fastening device which may be constructed from the blank represented in Fig. 1;

Fig. 3 is an end elevation of Fig. 2;

Fig. 4 is a section view of the fastener shown in Figs. 3 and 4 showing the locking action of the shank legs as applied to a substantially round aperture in work;

Fig. 5 shows a series of another form of blank wherein the shank legs may be folded onto each other to provide the desired form of shank structure;

Fig. 6 is a side elevation of a fastening device which may be constructed from the blank shown in Fig. 5;

Fig. 7 is an end elevation of Fig. 6;

Fig. 8 is a top plan view of the fastening device of Figs. 6 and 7 as applied to a substantially rectangular aperture in work;

Fig. 9 is a similar view of the device as applied to a substantially round aperture in work;

Fig. 10 illustrates a series of another form of blank wherein the shanks of the devices are provided by folding the legs onto each other;

Fig. 11 is a side elevation of a fastening device which may be formed from the blank represented in Fig. 10;

Fig. 12 is an end elevation of Fig. 11; and

Fig. 13 is a top plan view of the device of Figs. 11 and 12 as applied to a substantially round aperture in work.

The various forms of fastening devices herein disclosed are preferably constructed of a single section of substantially flat metal such as a blank stamping of sheet metal, sheet spring steel, cold rolled metal, or the like. The devices are so formed that the respective shanks each comprise relatively yieldable, offset leg elements or shank sections integrally united in the leading end. Generally, the herein disclosed devices may be constructed from a blank of metal wherein the respective shank elements provided by the blank are bent back or distorted onto each other in folds disposed at an angle such that the free ends of the elements are laterally yieldable with respect to each other. On bending the blanks to thus dispose the folds at an angle, the leg elements of the shanks must naturally lie offset with respect to each other in normal, untensioned relation. And since the degree of offset of the legs is determined by the angle of the fold, the disposition of the legs relative to each other in normal position may assume a laterally offset or other form of offset relation; this offset relation of the legs may be so designed as to be the most effective in an aperture of predetermined size in any desired location or installation. Thus on being applied to a work aperture of smaller width or diameter that the distance between the outer longitudinal edges of the legs in their normal, untensioned laterally offset relation, the legs are caused to move from their normal, offset relation to a position approaching alignment or approximate alignment. Such movement of the shank legs from their normal, untensioned, laterally offset relation is designed to set up an extraordinary tension in the legs, which tension is exerted against the adjacent walls of the work aperture. In many instances the tension thus exerted is sufficient to maintain a device rigidly in fastening position in the work due to the unusual frictional engagement thus obtained against the side walls of the aperture. Where such frictional engagement alone is sufficient to maintain the shank in its applied position, the shank may be utilized as a separable fastening element and be withdrawn and removed as desired, without weakening, mutilating or otherwise injuring the same. On removing the shank from an aperture the legs naturally tend to assume their initial, normal, untensioned, offset relation whereupon the device may again be employed in the same or a similar installation from which it was removed, much in the manner of a push or snap stud.

In many other instances however it is necessary or desirable that the fastening device be not readily removed or easily withdrawn from its applied fastening position. In such instances it is decidedly advantageous to employ on the legs of the shank some form of locking means to act in addition to the frictional engagement of the legs against the aperture side walls. Such locking means may be provided by recesses, shoulders, lugs, or series of teeth disposed on the legs preferably along the longitudinal edges thereof such as to contact and engage the aperture side walls and adjacent underface of the work.

Figs. 1–4 inclusive, show a form of the device which may be constructed from a blank of the general configuration shown in Fig. 1. The blank is stamped to provide a pair of shank legs 11, 12 integral in the leading end of the device as at 10. A recess 13 and a slot 14 on either side of the area in which the legs are integral, weakens the metal such that it may be sufficiently distorted to allow the legs to be lapped one upon the other as shown in Fig. 2. Along the inner longitudinal edges of the legs 11, 12 are formed lug, shoulder, or abutment means such as series of teeth 15, 16. The teeth may each be formed such that the upper edge thereof is slightly upwardly inclined as shown in Fig. 1 prior to deformation of the blank. When the blank is deformed as shown in Figs. 2 and 3, the inner longitudinal edges of the legs then become the outer longitudinal edges of the effective portions of the shank legs of the fastener. The legs are thus disposed in laterally offset relation to engage the side walls of an aperture in work as shown in Fig. 4. And since the upper edge of each tooth is slightly upwardly inclined in the stamping of the blank as shown in Fig. 1, such upper edge of each tooth is disposed on a substantial horizontal when the legs are bent to the desired form shown in Fig. 2, whereby most effective locking engagement of the teeth with the work may be obtained. As shown in Fig. 4, this form of the device is adapted for use in a round aperture in work, W, although it is obvious that it may be readily employed in apertures of any other configuration.

In use, the device is applied to a work aperture the diameter of which need be only slightly greater than the outer overall width of the shank at its leading end, Fig. 2. The use of a round aperture in work is preferable in that tools for punching the same are the simplest and cheapest and also, a fastening device on being applied to a round aperture may be rotated therein such that the head portions will lie in any desired position or relation with respect to a cooperating object or part fastened or supported thereby. The free ends 17, 18 of the shank legs may be bent substantially at right angles to the flat faces thereof to provide head sections to lie against the upper face of the work, or may be deformed for cooperation with an object to be secured or part to be supported In application, the leading end 10, Fig. 2, of the device is inserted into a work aperture and as the device is advanced to fastening position, the outer edges of the legs contact the side-walls of the aperture to cause a gradual movement of the legs from their normal, untensioned, laterally offset relation to a position of approximate alignment or approaching alignment, whereby tension is set up in the leg members which tension is exerted against the adjacent walls of the work aperture and adjacent underface of the work to retain the device in applied fastening position substantially as shown in Fig. 4.

The device may be readily removed by compressing the head sections 17, 18 toward each other or otherwise causing a movement of the shank legs to disengage the teeth 15, 16, from the work sufficient to allow the legs to pass through the aperture and permit the device to be withdrawn.

Figs. 5-9, inclusive, disclose another form of the device which may be constructed from a stamped blank such as illustrated in Fig. 5, the blanks being stamped from relatively wide strip stock. Each blank is so stamped as to provide a pair of legs 21, 22, the free ends of which may carry head sections 27, 28. The legs are integral as at 20 and are designed to be folded one upon the other substantially along the fold line 23 as shown in Fig. 6. In the stamping of the blanks, series of teeth are disposed on both the inner and outer longitudinal edges of the legs; however only one series of teeth on the inner, and one series on the outer longitudinal edges of the legs are effective in the use of the fastener when the legs are folded to the desired relation shown in Fig. 6. A simple, cheap, and expedient method for providing the effective teeth on each leg is accomplished by stamping the effective teeth 25 on the inner longitudinal edge of the leg 21 Fig. 5 and thus partially sever the blanks such as to provide the respective, integrally united legs 21, 22 of each shank. The effective teeth 24 on the outer longitudinal edges of the legs 22 may be stamped and formed by a suitable tool which also severs the completed blank from the next succeeding blank. As shown in Figs. 8 and 9, devices of this form are readily adapted for use in either a round or rectangular aperture in work, with the teeth 25 on leg 21 and teeth 24 on leg 22 being designed to engage the adjacent walls of the opening into which the device is inserted. In application and use, devices of this form are substantially similar to those described in connection with Figs. 1-4 inclusive.

Figs. 10-13, inclusive, show another form of device which may be constructed from a stamped blank such as shown in Fig. 10. The stamped blanks are preferably severed from relatively wide strip stock in substantially a V-shape such as to provide legs 31, 32 which may be provided with head sections 37, 38. The blank is designed to be folded substantially along line 33 as shown in Fig. 11. In the blanking and severing operation suggested in Fig. 10, series of teeth may be formed on each of the longitudinal edges of the legs 31, 32; however only the series of teeth designated 34, 35 are effective when the blank is folded into the desired form of shank as shown in Figs. 11 and 12. In application and use, this form of the device is similar to that described in connection with Figs. 1-4 inclusive.

From the foregoing it may be seen that the forms of devices herein disclosed may be most economically manufactured without loss or waste of material and in this respect are decidedly advantageous over those of the prior art structures designed for similar use.

It will also be appreciated that the shank legs of the various devices engage in a work aperture with unusual tenacity and are therefore not subject to loosening or accidental removal from applied fastening position by reason of jarring or vibration.

While the invention has been described in detail with specific examples, such examples are illustrative only since other modifications within the spirit and scope of the invention will be apparent to those skilled in the art. Hence the invention is to be understood as limited only as indicated in the appended claims in which the intent is to set forth all the novelty over the prior art.

What is claimed is:

1. For use in preperforated apertured work, a sheet metal snap fastening comprising a sheet metal blank providing distinct blank elements integral at one end and a head at the opposite end thereof, said blank having a fold in the area in which said blank elements are integral to dispose said blank elements one upon the other in providing a shank comprising a pair of leg members integrally united to form a leading end for the device, said shank being of greater length than the thickness of the apertured work to which it is applied, and said fold being such as to dispose said leg members laterally at an angle to each other in normal untensioned relation and thereby present a laterally offset projecting shoulder portion on at least one of said leg members, said laterally offset projecting shoulder portion being adapted to engage the underface of the work to lock the device in applied fastening position under spring tension exerted by said leg members attempting to assume their normal untensioned relation.

2. For use in preperforated apertured work, a sheet metal snap fastening comprising a sheet metal blank providing distinct blank elements integral at one end and a head at the opposite end thereof, said blank having a fold in the area in which said blank elements are integral to dispose said blank elements one upon the other in providing a shank comprising a pair of leg members integrally united to form a leading end for the device, said shank being of greater length than the thickness of the apertured work to which it is applied, and said fold being such as to dispose said leg members laterally at an angle to each other in normal untensioned relation and thereby present a laterally offset projecting portion on at least one of said leg members, said laterally offset projecting portion including a shoulder and inclined guide edges effecting a gradual relative lateral contraction of the leg members as the device is advanced in a work aperture to engage said shoulder with the underface of the work and thereby lock the device in applied fastening position under spring tension exerted by said leg members attempting to assume their normal untensioned relation.

3. For use in preperforated apertured work, a sheet metal snap fastening comprising a sheet metal blank providing distinct blank elements integral at one end and a head at the opposite end thereof, said blank having a fold in the area in which said blank elements are integral to dispose said blank elements in overlying relation in providing a shank, said shank comprising leg members formed from said blank elements and integrally united to form a leading end for the device, said fold being such as to dispose said leg members laterally at an angle to each other in normal untensioned relation and thereby present laterally offset projecting portions on said leg members, said laterally offset projecting portions including work engaging shoulders adapted to engage in an aperture in the work to lock the device in applied fastening position under spring tension exerted by said leg members attempting to assume their normal untensioned relation.

4. For use in preperforated apertured work, a sheet metal snap fastening comprising a sheet metal blank providing distinct blank elements integral at one end and a head at the opposite end thereof, said blank having a fold in the area in which said blank elements are integral to dispose said blank elements one upon the other in providing a shank comprising a pair of leg members integrally united to form a leading end for the device, said shank being of greater length than the thickness of the apertured work to which it is applied, and said fold being such as to dispose said leg members laterally at an angle to each other in normal untensioned relation and thereby present laterally offset projecting portions on said leg members, said laterally offset projecting portions including work engaging shoulders adapted to engage the underface of the work to lock the device in applied fastening position under spring tension exerted by said leg members attempting to assume their normal untensioned relation.

5. For use in preperforated apertured work, a sheet metal snap fastening comprising a sheet metal blank providing distinct blank elements integral at one end and a head at the opposite end thereof, said blank having a fold in the area in which said blank elements are integral to dispose said blank elements one upon the other in providing a shank comprising a pair of leg members integrally united to form a leading end for the device, said shank being of greater length than the thickness of the work to which it is applied, and said fold being such as to dispose said leg members laterally at an angle to each other in normal untensioned relation and thereby present laterally offset projecting portions on said leg members, said laterally offset projecting portions including inclined guide edges and work engaging shoulders, said inclined guide edges effecting a gradual relative lateral contraction of the leg members as the device is advanced in a work aperture and said work engaging shoulders being adapted to engage the underface of the work to lock the device in applied fastening position under spring tension exerted by said leg members attempting to assume their normal untensioned relation.

HERMAN G. LOMBARD.